United States Patent
Xu et al.

(10) Patent No.: US 10,412,623 B2
(45) Date of Patent: Sep. 10, 2019

(54) MBMS BEARER-BASED METHOD AND SYSTEM FOR QUERYING NODE STATE IN CLUSTER COMMUNICATION AND STORAGE MEDIUM

(71) Applicant: ZTE Corporation, Shenzhen, Guangdong (CN)

(72) Inventors: Hui Xu, Shenzhen (CN); Hongjun Liu, Shenzhen (CN); Zijiang Ma, Shenzhen (CN); Chen Lu, Shenzhen (CN); Yaying Wang, Shenzhen (CN)

(73) Assignee: ZTE CORPORATION (CN)

( * ) Notice: Subject to any disclaimer, the term of this patent is extended or adjusted under 35 U.S.C. 154(b) by 342 days.

(21) Appl. No.: 15/514,021

(22) PCT Filed: Mar. 16, 2015

(86) PCT No.: PCT/CN2015/074318
§ 371 (c)(1),
(2) Date: May 8, 2017

(87) PCT Pub. No.: WO2016/015472
PCT Pub. Date: Feb. 4, 2016

(65) Prior Publication Data
US 2017/0251397 A1    Aug. 31, 2017

(30) Foreign Application Priority Data
Jul. 31, 2014 (CN) .......................... 2014 1 0373252

(51) Int. Cl.
*H04W 28/02*    (2009.01)
*H04W 4/06*    (2009.01)
(Continued)

(52) U.S. Cl.
CPC ......... *H04W 28/0289* (2013.01); *H04W 4/06* (2013.01); *H04W 4/08* (2013.01); *H04L 12/189* (2013.01)

(58) Field of Classification Search
CPC ..... H04W 28/0289; H04W 4/06; H04W 4/08; H04L 12/189
See application file for complete search history.

(56) References Cited

U.S. PATENT DOCUMENTS

2017/0251398 A1* 8/2017 Xu .......................... H04W 4/06
2017/0295519 A1* 10/2017 Xu .......................... H04L 47/12

FOREIGN PATENT DOCUMENTS

| CN | 103220625 A | 7/2013 |
| CN | 103428856 A | 12/2013 |
| CN | 104270725 A | 1/2015 |
| CN | 104301931 A | 1/2015 |

OTHER PUBLICATIONS

International Search Report in international application No. PCT/CN2015/074318, dated May 26, 2015, 2 pgs.

(Continued)

*Primary Examiner* — Melvin C Marcelo
(74) *Attorney, Agent, or Firm* — McDonald Hopkins LLC

(57) ABSTRACT

Disclosed are an MBMS bearer-based method and system for querying a node state in cluster communication and a storage medium. The method comprises: a cluster service application server transmits to a network node employing a multimedia broadcast multicast service (MBMS) bearer for transmitting a cluster service a request message for reporting a node state, receives node state information reported by the network node, selects, on the basis of the node state information, a mode for transmitting the cluster service, and mitigates impacts of congestion or overload on a target UE receiving the cluster service; the node state information comprises a congestion/overload identifier, an MBMS service area identifier, an MBMS service identifier, a conges- (Continued)

tion/overload start/end identifier. The technical solution of embodiments of the present invention mitigates the impacts of congestion or overload on the cluster service, thus enhancing user experience with the service.

15 Claims, 6 Drawing Sheets

(51) Int. Cl.
*H04W 4/08* (2009.01)
*H04L 12/18* (2006.01)

(56) References Cited

OTHER PUBLICATIONS

English Translation of the Written Opinion of the International Search Authority in international application No. PCT/CN2015/074318, dated May 26, 2015, 6 pgs.

Supplementary European Search Report in European application No. 15827269.0, dated Sep. 20, 2017, 7 pgs.

"eMBMS Heavy/Over Utilisation Procedure", Jul. 2014, Vodafrone, S2-142627, 3rd Generation Partnership Project (3GPP). SA WG2 Meeting #104, Dublin. Ireland; Retrieved from the Internet:URL:http://www.3gpp.org/ftp/tsg sa/WG2Arch/TSGS2 104 Dublin/Docs/, 3 pgs.

"Handling When the Multicast Service Not Available", Jan. 2014, S2-140488 0445, 3rd Generation Partnership Project, SA WG2 Temporary Document, 3GPP TSG SA WG2 Meeting #101, Taipei. Taiwan; Retrieved from the Internet:URL:http://www.3gpp.org/ftp/tsg sa/WG2 Arch/TSGS2 101 Taipei/Docs/, 5 pgs.

"Notification of MBMS Conditions". Jul. 2014, S2-142496, 3rd Generation Partnership Project, SA WG2 Temporary Document, SA WG2 Meeting #104, Dublin. Ireland; Retrieved from the Internet:URL:http://www.3gpp.org/ftp/tsg sa/WG2 Arch/TSGS2 104 Dublin/Docs, 3 pgs.

\* cited by examiner

US 10,412,623 B2

MBMS BEARER-BASED METHOD AND SYSTEM FOR QUERYING NODE STATE IN CLUSTER COMMUNICATION AND STORAGE MEDIUM

TECHNICAL FIELD

The disclosure relates to Multimedia Broadcast Multicast Service (MBMS) bearer-based group communication techniques, and in particular to a method and system for querying a node state in MBMS bearer-based group communication, and a storage medium.

BACKGROUND

A group communication system is a dedicated wireless communication system that is developed to meet users' demands for command and dispatch and applied in specific industries. In the group communication system, a large number of wireless users share a small number of wireless channels. With command and dispatch as main applications, the group communication system is a multi-purpose and highly efficient wireless communication system. The group communication system has a wide range of applications in fields such as government sectors, public safety, emergency communications, electricity, civil aviation, petrochemical industry and military affairs. The distinguishing feature between the group communication system and a public communication system lies in that the group communication system needs to have highly efficient command and dispatch performance, and requires its network to be highly reliable and secure.

In 3rd Generation Partnership Project (3GPP) LTE, the group communication system is referred to Group Communication Service Enabler (GCSE). FIG. 1 shows the system architecture of an LTE GCSE.

In order to make efficient use of resources of a mobile network, the 3GPP proposes Multimedia Broadcast Multicast Service (MBMS). The service is a technology that transmitting data from a data source to multiple target mobile terminals, achieves sharing of resources of the network (including core network and access network), and improves the utilization ratio of the network resources (especially air interface resources). The MBMS defined by the 3GPP enables not only low-speed message-class multicast and broadcast of plaintext, but also broadcast and multicast of high-speed multimedia services, thus providing various abundant video, audio and multimedia services. This undoubtedly conforms to the development trends of future mobile data and provides better service prospects for the development of 3G. FIG. 2 shows a diagram of MBMS architecture in LTE.

At present, the industry is discussing the possibility of implementing group communication by employing MBMS technology. For a specific group communication UE, a required Group Communication Service (GCS) may be received in any one of the following two modes: multicast and unicast. The multicast mode refers to receiving the GCS through an MBMS bearer. In this case, the UE needs to have MBMS receiving capability.

In the research and practice of the prior art, it is found that the prior art has the following problems: when sending a GCS through a MBMS bearer, a Group Communication Service Application Server (GCS AS) is required to acquire a network node state and deploy the GCS according to the network node state. There is no related technical solution available for reference in the prior art.

SUMMARY

To solve the above technical problems, embodiments of the disclosure provide a method and system for querying a node state in Multimedia Broadcast Multicast Service (MBMS) bearer-based group communication and a storage medium, which can eliminate, according to state information reported by a network node, impact of congestion or overload on a Group Communication Service (GCS).

The technical solutions of embodiments of the disclosure are it p emented as follows.

There is provided a method for querying a node state in MBMS bearer-based group communication, including: a Group Communication Service Application Server (GCS AS) sends, to a network node sends a GCS using an MBMS bearer, a request to report a network node state, receives node state information reported by the network node, and selects, according to the network node state information, a mode for sending the GCS to reduce impact of congestion or overload on reception of the GCS by a target UE, herein the network node state information includes at least one of: a congestion/overload identifier, an MBMS SAI (Service Area Identifier), an MBMS Temporary Mobile Group Identity (TMGI), and a congestion/overload start/end identifier.

In an implementation, the MBMS bearer may include a core network bearer and an air interface bearer; and the MBMS bearer is established before the GCS starts.

In an implementation, the network node includes at least one of: an evolved Node B (eNodeB), a Multi-cell/Multicast Coordination Entity (MCE), a Mobility Management Entity (MME), a MBMS Gateway (MBMS GW), and Broadcast Multicast Service Center (BM-SC).

In an implementation, the congestion may include that control plane signalling and/or user plane load in the network reaches a predetermined threshold; and the overload may include that the control plane signalling and/or the user plane load in the network exceeds capability of the network node so that the network node is not capable of processing extra signalling and/or extra user plane load any more.

In an implementation, the mode for sending the GCS may include: when no congestion/overload occurs, sending of the GCS is continued using a current MBMS bearer, or a new GCS is added to the current MBMS bearer; when the congestion occurs, a unicast bearer is established for the target UE, and the GCS is sent via the unicast bearer; and when the overload occurs, GCSs to be sent are queued and the queued GCSs are sent after the overload ends, or a GCS of high priority is made to pre-empt a resource of a current GCS to ensure sending of the GCS of high priority.

There is provided A system for querying a node state in MBMS bearer-based group communication, including a Group Communication Service Application Server (GCS AS) and a network node, in which: the GCS AS is arranged to send, to a network node, a request to report a network node state, receive node state information reported by the network node, and select, according to the network node state information, a mode for sending a GCS to reduce impact of congestion or overload on reception of the GCS by a target UE; and the network node is arranged to send the GCS using an MBMS bearer, obtain the network node state information of the network node after receiving the request, and send the network node state information to the GCS AS. The network node state information includes a congestion/overload identifier, an MBMS SAI (Service Area Identifier), an MBMS Temporary Mobile Group Identity (TMGI), and a congestion/overload start/end identifier.

In an implementation, the MBMS bearer includes a core network bearer and an air interface bearer; and the MBMS bearer is established before the GCS starts.

In an implementation, the network node includes at least one of: an evolved Node B (eNodeB), a Multi-cell/Multicast Coordination Entity (MCE), a Mobility Management Entity (MME), a MBMS Gateway (MBMS GW), and a Broadcast Multicast Service Center (BM-SC).

In an implementation, the congestion includes that the control plane signalling and/or the user plane load in the network reaches a predetermined threshold; and the overload includes that the control plane signalling and/or the user plane load in the network exceeds capability of the network node such that the network node is not capable of processing extra signalling and/or extra user plane load any more.

In an implementation, the mode for sending the GCS includes: when no congestion/overload occurs, sending of the GCS is continued using a current MBMS bearer, or a new GCS is added to the current MBMS bearer; when the congestion occurs, a unicast bearer is established for the target UE, and the GCS is sent via the unicast bearer; and when the overload occurs, GCSs to be sent are queued and the queued GCSs are sent after the overload ends, or a GCS of high priority is made to pre-empt a resource of a current GCS to ensure sending of the GCS of high priority.

There is further provided a storage medium having stored thereon computer programs arranged to execute the foregoing method for querying a node state in MBMS bearer-based group communication.

In the embodiments of the disclosure, a GCS AS requests a 3GPP (3rd Generation Partnership Project) network node that sends a GCS using a MBMS bearer to report a network node state, the network node that has received the request reports the network node state information to the GCS AS via the 3GPP network, and the GCS AS that has received the network node state information determines the congested/overloaded network node and executes a corresponding strategy with respect to the congested/overloaded network node to reduce impact of the congestion or the overload on reception of the GCS by the target UE. The technical solution provided by embodiments of the disclosure enables a GCS AS to timely obtain a 3GPP network node state and to deploy the GCS according to the node state, thus reducing the impact of congestion or overload on the GCS and enhancing user experience with the service.

DETAILED DESCRIPTION

To make the objects, advantages and technical solutions of the disclosure more apparent and clear, hereinafter the disclosure will be further described in details through embodiments and with reference to the drawings.

In the embodiments of the disclosure, unless otherwise specified, MBMS (Multimedia Broadcast Multicast Service) indicates evolved MBMS, namely, eMBMS. AS (Application Server) indicates GCS AS (Group Communication Service Application Server).

Figure 1:
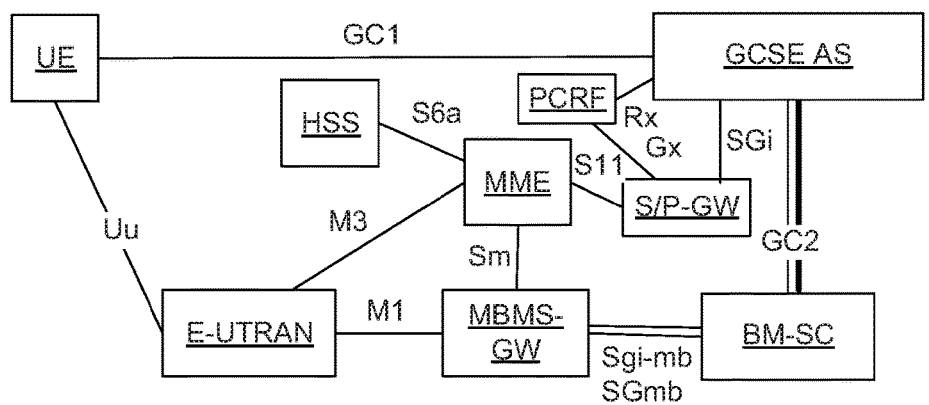
FIG. 1 is a diagram of the architecture of group communication system.
Figure 2:
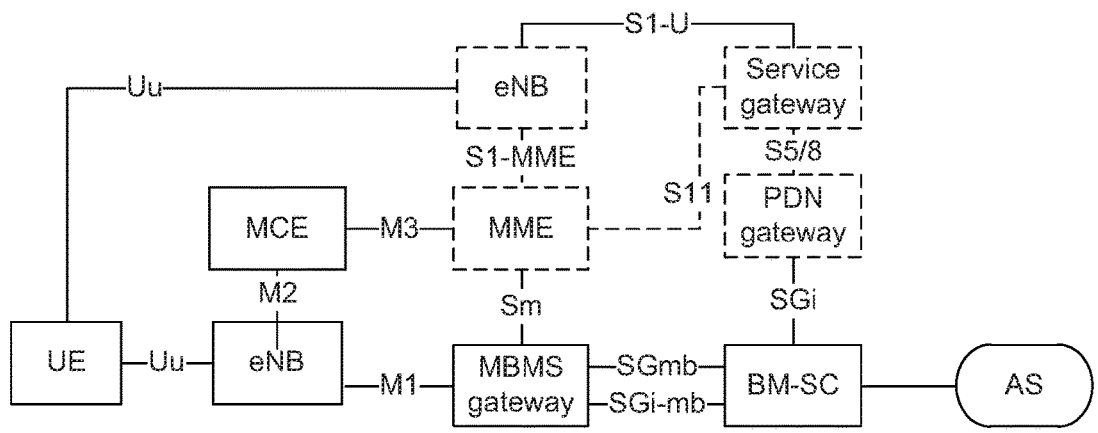
FIG. 2 is a diagram of the communication architecture of MBMS (Multimedia Broadcast Multicast Service)
Figure 3:
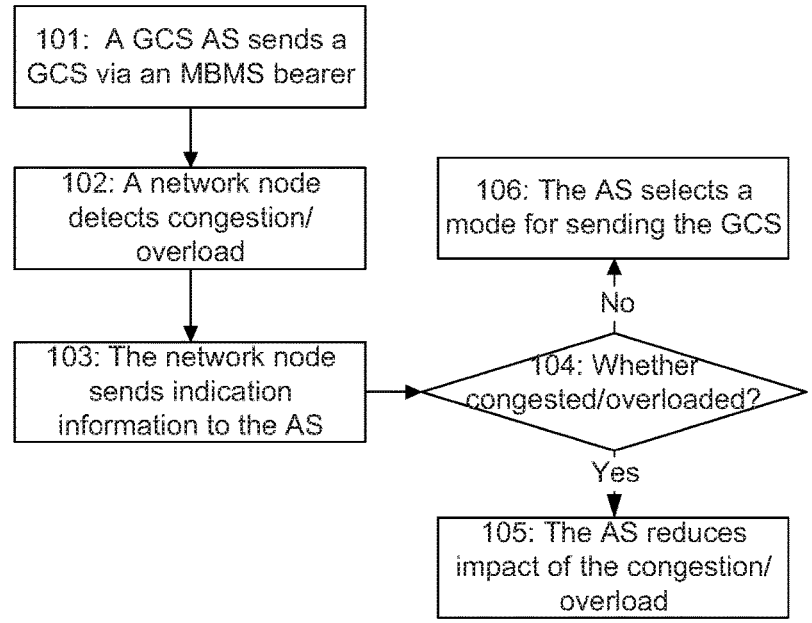
FIG. 3 is a flowchart of a method for querying a node state in MBMS bearer-based group communication according to an embodiment of the disclosure.

As shown in FIG. 3, a method for querying a node state in MBMS bearer-based group communication according to an embodiment of the disclosure includes the following steps 101-106.

In step 101, a GCS AS sends a Group Communication Service (GCS) via an MBMS bearer.

Before step 101 starts, a group communication UE first register in the GCS AS corresponding to the GCS. In this way, the GCS AS can know that how many UEs join a certain GCS.

The MBMS bearer has been pre-established before the GCS starts.

In the embodiments of the disclosure, the following descriptions refer to the same concept: MBMS bearer, MBSFN bearer, multicast bearer and point-to-multipoint PTM bearer.

The MBMS bearer includes a core network bearer, namely, EPC (Evolved Packet Internet Core) bear and an air interface bearer. In the embodiments of the disclosure, MBMS air interface resources are arranged via RAN (Radio Access Network) network elements, such as an evolved Node B, and/or an MBMS MCE (Multi-cell/multicast Coordination Entity), and MBMS configuration information and group communication data are sent in an air interface.

It should be pointed out that the above GCS can also be ordinary MBMS. The ordinary MBMS can be differentiated from the GCS by different QCI parameters. For the ordinary MBMS, the corresponding MBMS bearer needs no pre-establishment.

In step 102, the AS sends a request to a network node.

The AS sends the request to the network node via 3GPP (3rd Generation Partnership Project) network.

The network node includes an eNodeB, an MCE, a Mobility Management Entity (MME), an MBMS Gateway (MBMS GW), or a Broadcast Multicast Service Center (BM-SC).

The request includes one or more of the following contents: one or more SAs, one or more Temporary Mobile Group Identities (TMGIs) in each SA, congestion indication and overload indication.

When the request includes one or more SAs but does not include one or more TMGIs corresponding to each SA, the network node needs to report congestion/overload indication of all TMGIs borne by the SA.

When the request includes one or more SAs, and also includes one or more TMGIs corresponding to each SA, the network node needs to report the congestion/overload indication of the TMGIs indicated by the SA.

When the request includes the congestion indication, the overload indication, or the congestion/overload indication, the network node needs to report all the TMGIs to which congestion occurs (start) or overload occurs (start).

The congestion indicates that the control plane signalling and/or the user plane load in the network reaches a certain predetermined threshold, and the overload indicates that the network node is not capable of processing extra signalling and/or extra user plane load any more.

In step 103, the network node sends state indication information of the network node to the AS.

The state indication information includes at least one of the followings: a congestion/overload identifier, an MBMS SAI (Service Area Identifier), an MBMS Temporary Mobile Group Identity (TMGI), and a congestion/overload start/end identifier.

Herein, the congestion/overload identifier is used to indicate that network is congested or overloaded; the SAI is used to indicate service areas affected by the congestion/overload; and the TMGI is used to indicate the GCS affected by the congestion/overload.

The contents of the congestion/overload start/end can include at least one of the followings: start (indicated by 1 or true) and end (indicated by 0 or false).

The congestion/overload start/end, namely, congestion/overload start is equivalent to that the congestion/overload occurs currently, and congestion/overload end is equivalent to that the congestion/overload does not occur currently or the started congestion/overload has ended.

In the embodiments of the disclosure, the node congestion indicates that control plane signalling and/or user plane data load in the network reaches a certain predetermined threshold, and the node overload indicates that the network node is not capable of processing extra control plane signalling and/or extra user plane data load any more.

The contents of the information reporting MBMS congestion/overload are: assuming that C indicates congestion and that 0 indicates overload. Refer to the example below:
 {SA1:TMGI 1,TMGI2,TMGI3; C, true}
 {SA2:TMGI5, TMGI6; O, false}
 {SA3:TMGI10: C, false}

In the above example, the congestion occurs to TMGI 1, TMGI2 and TMGI3 in SA1; the overload of TMGI5 and TMGI6 in SA2 has ended; and the congestion of TMGI10 in SA3 has ended.

When the overload indication 0 is 1 (true), the congestion indication C may not be sent any more, or although the congestion indication C is sent, the UE can ignore the indication.

In step 104, it is determined whether there is congestion/overload, and if yes, proceed to step 105, or else, proceed to step 106.

The congestion/overload indicates the congestion/overload of the control plane signalling and/or the user plane data.

In step 105, the AS takes actions to reduce impact of the congestion/overload.

The AS first determines, according to the above state indication information, the affected target UE and the TMGI of the GCS, then the AS determines, according to the state indication information and a local strategy, the to-be-taken actions. For example, when the congestion occurs, establishing a unicast bearer for the target UE and sending the GCS via the unicast bearer; and when the overload occurs, the AS queues GCSs to be sent and sends the queued GCSs after the overload ends or the AS uses the GCS of high priority to pre-empt the resource of the current GCS.

In step 106, the AS selects a mode for sending the GCS to the UE.

The AS selects, according to the above state indication information, the proper mode to send the new GCS to the target UE. When no congestion/overload occurs, sending of the GCS is continued using a current MBMS bearer, or a new GCS is added to the current MBMS bearer.

The technical solutions provided by embodiments of the disclosure will be further described hereinafter via specific examples of GCS procedures.

First Embodiment

Figure 4:
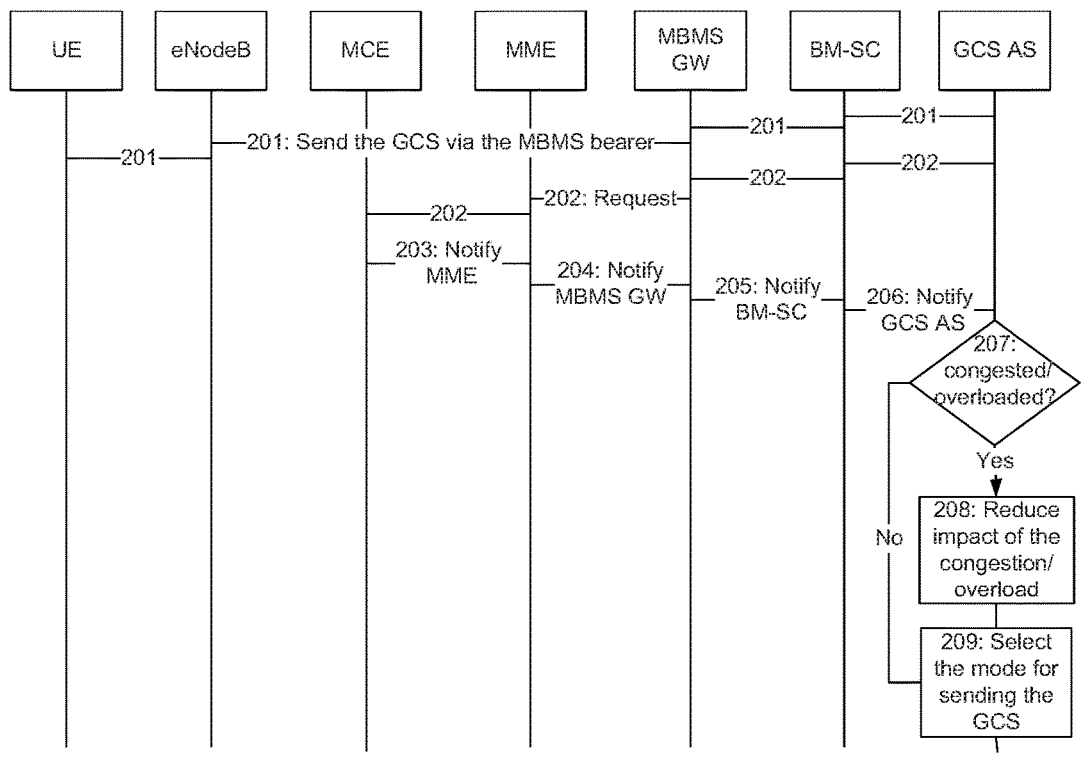
FIG. 4 is a flowchart of a method for querying a node state in MBMS bearer-based group communication according to a first embodiment of the disclosure.

In the scene that the network node requested by the AS is the MCE, as shown in FIG. 4, the method for querying a node state in MBMS bearer-based group communication according to the embodiment includes the following steps 201-209.

In step 201, an AS sends the GCS via an MBMS bearer.

The MBMS bearer of the GCS has been pre-established before the GCS starts. For the ordinary MBMS, the corresponding MBMS bearer needs no pre-establishment.

In step 202, the AS sends a request to an MCE.

The AS sends the request to the MCE via the path AS→BM-SC→MBMS GW→MME→MCE.

In step 203, the MCE sends state indication information to an MME.

The MCE sends the indication information to the MME via an M3 interface. The indication information can be achieved via the expansion of the current M3 interface signalling or the establishment of a new procedure of M3 interface signalling.

The indication information includes at least one of the followings: a congestion/overload identifier, an MBMS SAI, an MBMS TMGI, and a congestion/overload start/end identifier.

In step 204, the MME sends the state indication information to an MBMS GW.

The MME sends the congestion/overload indication information to the MBMS GW via a Sm interface. The indication information can be achieved via the expansion of current Sm interface signalling or the establishment of a new procedure of Sm interface signalling.

In step 205, the MBMS GW sends the state indication information to a BM-SC.

The MBMS GW sends the congestion/overload indication information to the BM-SC via a SGmb interface. The indication information can be achieved via the expansion of the current SGmb interface signalling or the establishment of a new procedure of SGmb interface signalling.

In step 206, the BM-SC sends the state indication information to the AS.

The BM-SC sends the congestion/overload indication information to the AS via an MB2 interface. The indication information can be achieved via the expansion of the current MB2 interface signalling or the establishment of a new procedure of MB2 interface signalling.

In step 207, it is determined whether the congestion/overload occurs in the MCE, and if yes, proceed to step 208, or else, proceed to step 209.

In step 208, the AS takes actions to reduce impact of the congestion/overload.

The AS first determines the affected target UE and GCS, and takes actions according to congestion and overload information. For example, when the congestion occurs, the AS sends the GCS by adopting the unicast bearer, and when the overload occurs, the AS queues GCSs to be sent and sends the queued GCSs after the overload ends or uses the GCS of high priority pre-empt the resource of the current GCS.

In step 209, the AS selects the mode for sending the GCS to the target UE.

Second Embodiment

Figure 5:
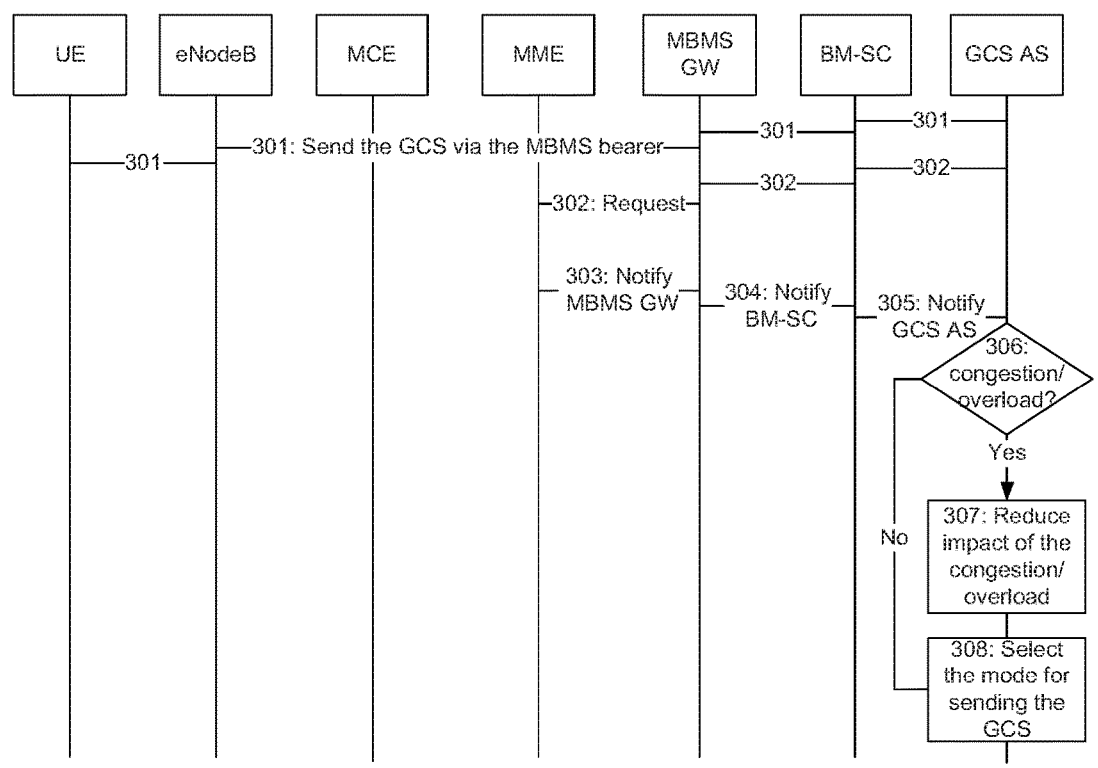
FIG. 5 is a flowchart of a method for querying a node state in MBMS bearer-based group communication according to a second embodiment of the disclosure.

In the scene that the network node is the MME, as shown in FIG. 5, the method for querying a node state in MBMS bearer-based group communication according to the embodiment includes the following steps 301-308.

In step 301, the AS sends the GCS via the MBMS bearer. The step is identical to step 101, and will not be repeated.

In step 302, the AS sends the request to the MME.

The MME sends the request to the MME via the path AS→BM-SC→MBMS GW→MME.

In step 303, the MME sends the state indication information to the MBMS GW.

The MME sends the congestion/overload indication information to the MBMS GW via the Sm interface.

In step 304, the MBMS GW sends the state indication information to the BM-SC.

The MBMS GW sends the congestion/overload indication information to the BM-SC via the SGmb interface.

In step 305, the BM-SC sends the state indication information to the AS.

In step 306: the AS determines whether the congestion/overload occurs to the node, and if yes, proceed to step 307, or else, proceed to step 308.

In 307, the AS takes actions to reduce impact of the congestion/overload.

In step 308, the AS selects the mode for sending the GCS to the UE.

Third Embodiment

Figure 6:
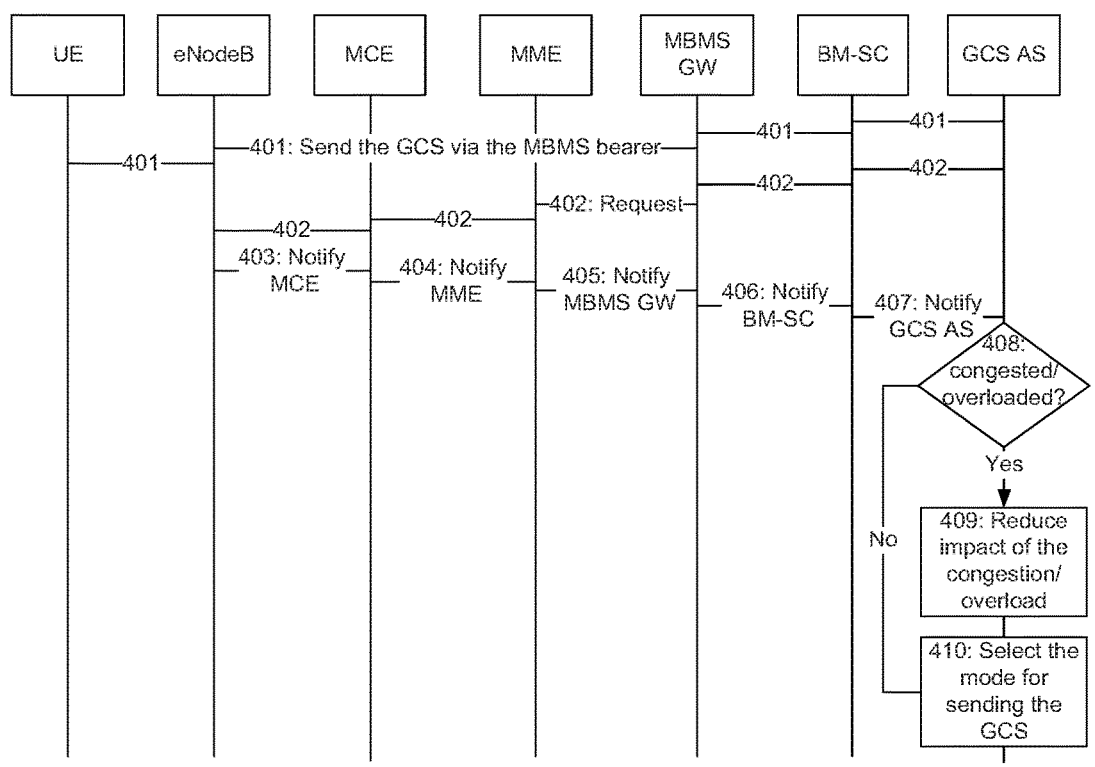
FIG. 6 is a flowchart of a method for querying a node state in MBMS bearer-based group communication according to a third embodiment of the disclosure.

In the scene that the network node requested by the AS is the eNodeB, as shown in FIG. 6, the method for querying a node state in MBMS bearer-based group communication according to the embodiment includes the following steps 401-410.

In step 401, the AS sends the GCS via the MBMS bearer.

In step 402, the AS sends the request to the eNB.

The AS sends the request to the eNB via the path AS→BM-SC→MBMS GW→MME→MCE→eNB.

In step 403, the eNB sends the state indication information to the MCE.

The eNB sends the congestion/overload indication information to the MCE via the M2 interface.

The congestion/overload indication information includes at least one of the followings: a congestion/overload identifier, an MBMS SAI, and an MBMS TMGI.

Herein, the congestion/overload identifier is used to indicate network congestion or overload, and the network congestion identifier can include multiple levels such as high level, middle level and low level; the SAI is used to indicate service areas affected by the congestion/overload; and the TMGI is used to indicate the GCS affected by the congestion/overload.

The contents of the congestion/overload identifier can include at least one of the followings: node congestion indication information and node overload indication information.

The node congestion indicates that the control plane signalling and/or the user plane load in the network reaches a certain predetermined threshold, and the node overload indicates that the network node is not capable of processing extra control plane signalling and/or extra user plane load any more.

The eNB detects whether a PMCH (Physical Multicast Channel) is congested or overloaded.

In step 404, the MCE sends the state indication information to the MME.

In step 405, the MME sends the state indication information to the MBMS GW.

In step 406, the MBMS GW sends the state indication information to the BM-SC.

In step 407, the BM-SC sends the state indication information to the AS.

In step 408, the AS determines whether there is congestion/overload, and if yes, proceed to step 409, or else, proceed to step 410.

In step 409, the AS takes actions to reduce impact of the congestion/overload.

In step 410, the AS selects the mode for sending the GCS to the UE.

Fourth Embodiment

Figure 7:
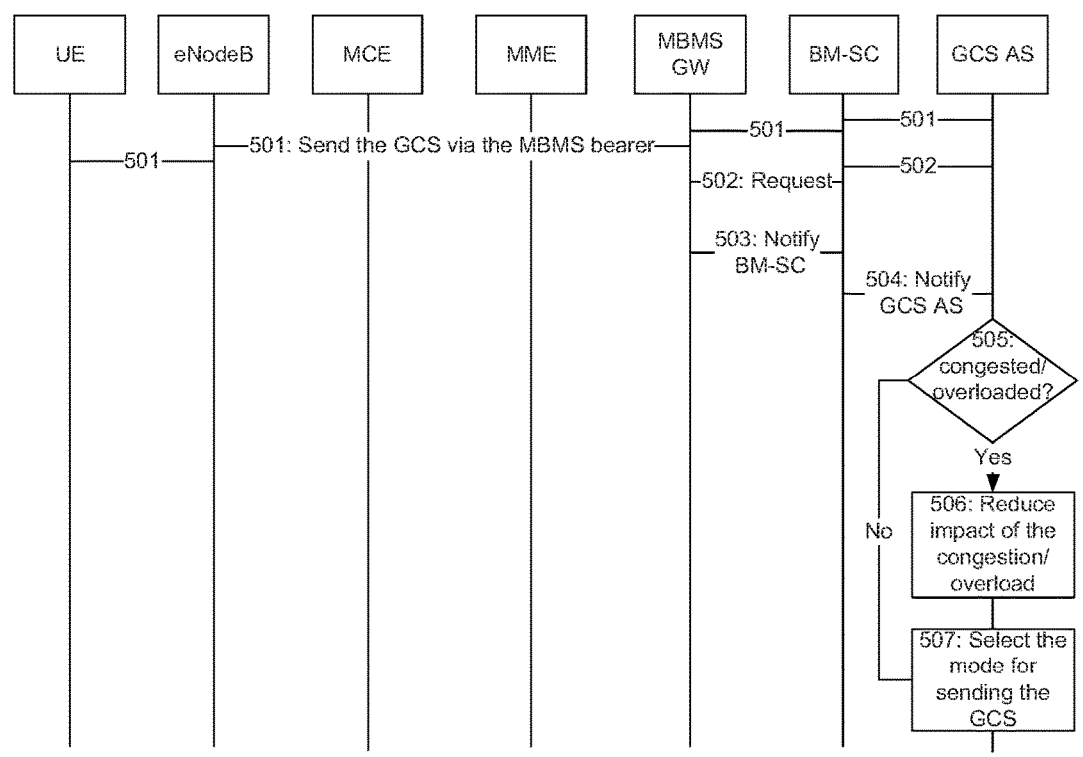
FIG. 7 is a flowchart of a method for querying a node state in MBMS bearer-based group communication according to a fourth embodiment of the disclosure.

In the scene that the network node requested by the AS is the MBMS-GW, as shown in FIG. 7, the method for querying a node state in MBMS bearer-based group communication according to the embodiment includes the following steps 501-507.

In step 501, the AS sends the GCS via the MBMS bearer. The step is identical to step 101, and will not be repeated.

In step 502, the AS sends the request to the MBMS GW.

The AS sends the request to the MBMS GW via the path AS→BM-SC→MBMS GW.

In step 503, the MBMS GW sends the state indication information to the BM-SC.

In step 504, the BM-SC sends the state indication information to the AS.

In step 505, the AS determines whether there is congestion/overload, and if yes, proceed to step 506, or else, proceed to step 507.

In step 506, the AS takes actions to reduce impact of the congestion/overload.

In step 507, the AS selects the mode for sending the GCS to the UE.

Fifth Embodiment

Figure 8:
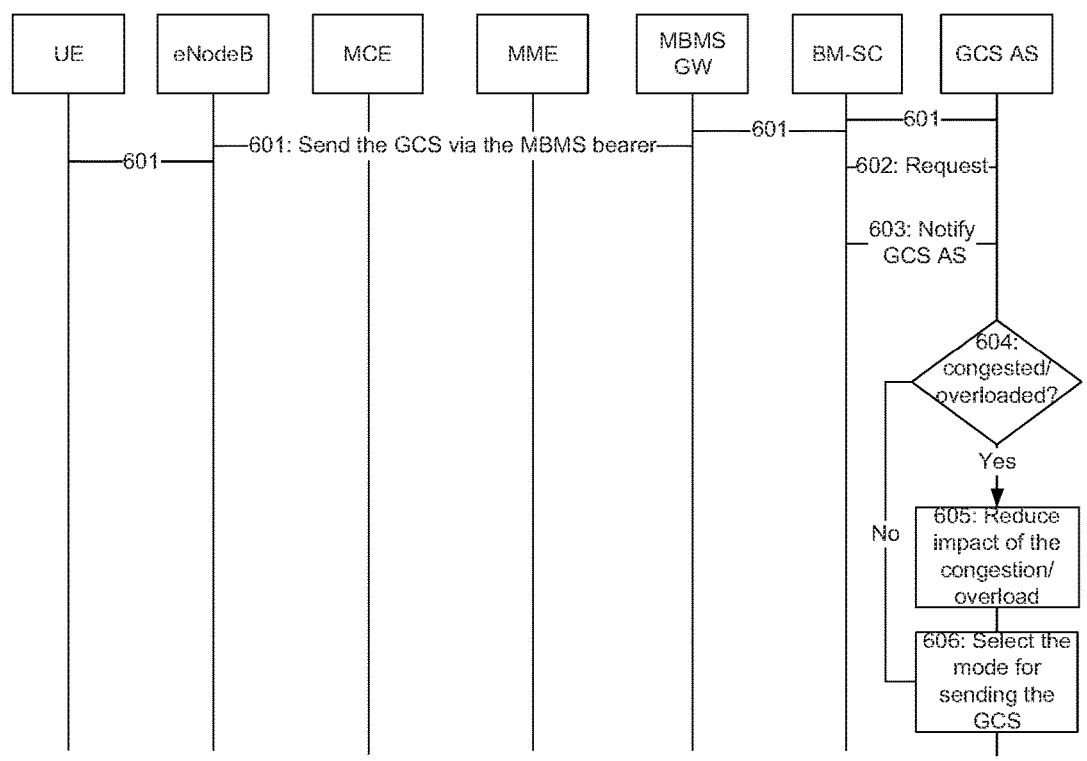
FIG. 8 is a flowchart of a method for querying a node state in MBMS bearer-based group communication according to a fifth embodiment of the disclosure.

In the scene that the network node requested by the AS is the BM-SC, as shown in FIG. 8, the method for querying a node state in MBMS bearer-based group communication according to the embodiment includes the following steps 601-606.

In step 601, the AS sends the GCS via the MBMS bearer. The step is identical to step 101, and will not be repeated.

In step 602, the AS sends the request to the BM-SC.

The congestion/overload is the congestion/overload of the control plane and/or the user plane.

In step 603, the BM-SC sends the state indication information to the AS.

In step 604, the AS determines whether there is congestion/overload, and if yes, proceed to step 605, or else, proceed to step 606.

In step 605, the AS takes actions to reduce impact of the congestion/overload.

In step 606, the AS selects the mode for sending the GCS to the UE.

The embodiments of the disclosure further describes a system for querying a node state in MBMS bearer-based group communication, and the system includes a Group Communication Service Application Server (GCS AS) and a network node.

Herein, the GCS AS is arranged to send, a network node, a request to report a network node state, receive node state information reported by the network node, selects, according to the network node state information, a mode for sending a Group Communication Service (GCS) to reduce impact of congestion or overload on reception of the GCS by a target UE; and the network node adopts a Multimedia Broadcast Multicast Service (MBMS) bearer to send the GCS, obtains the network node state information of the network node after receiving the request, and sends the network node state information to the GCS AS.

The network node state information includes a congestion/overload identifier, an MBMS SAI (Service Area Identifier), an MBMS Temporary Mobile Group Identity (TMGI), and a congestion/overload start/end identifier.

The MBMS bearer includes a core network bearer and an air interface bearer, and the MBMS bearer s established before the GCS starts.

The network node includes at least one of the followings:
an evolved Node B, an MCE, an MME, an MBMS GW, and a BM-SC.

The congestion includes that the control plane signalling and/or the user plane load in the network reaches a predetermined threshold; and the overload includes that the control plane signalling and/or the user plane load in the network exceeds capability of the network node such that the network node is not capable of processing extra signalling and/or extra user plane load any more.

The mode for sending the GCS includes:

when no congestion/overload occurs, sending of the GCS is continued using a current MBMS bearer, or a new GCS is added to the current MBMS bearer;

when the congestion occurs, a unicast bearer is established for the target UE, and the GCS is sent via the unicast bearer; and when the overload occurs, GCSs to be sent are queued and the queued GCSs are sent after the overload ends, or a GCS of high priority is made to pre-empt a resource of a current GCS to ensure sending of the GCS of high priority.

Those skilled in the art should recognize that the system for querying a node state in MBMS bearer-based group communication is set to achieve the foregoing method for querying a node state in MBMS bearer-based group communication, and that the functions and structures of related network elements can be recognized with reference to the description in the foregoing method embodiments.

Figure 9:
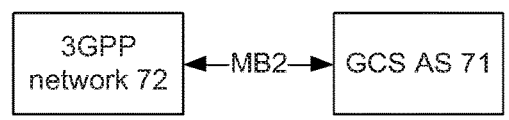
FIG. 9 is a structural diagram of a congestion state reporting system in MBMS bearer-based group communication according to an embodiment of the disclosure.

As a specific implementation, as shown in FIG. 9, the system for querying a node state in MBMS bearer-based group communication according to an embodiment of the disclosure includes:

a GCS AS 71, arranged to send a request to 3GPP network 72, receive state indication information sent by the 3GPP network 72, conduct, according to the indication information, the processing, and select the mode for sending the GCS; and the 3GPP network 72, arranged to receive the request of AS 71, detect a node state, and send the state indication information to the AS 71. The 3GPP network 72 includes the following network nodes: a BM-SC, an MBMS GW, an MME, an MCE and an eNodeB.

The embodiments of the disclosure further describes a storage medium, in which computer programs are stored. The computer programs are arranged to execute the foregoing method for querying a node state in MBMS bearer-based group communication.

The technical solutions described in the embodiments of the disclosure can be combined with each other in the case of no conflict.

It should be recognized that the method and intelligent device disclosed in the embodiments provided by the disclosure can be achieved through other modes. The above device embodiments are only for illustration, for example, the division of the unit is just the division of logical functions, and other division modes can be used in actual realization. For example, multiple units and assemblies can be combined or can be integrated into another system, or some characteristics can be ignored or may not be executed. Furthermore, the mutual coupling among each part, direct coupling, or communication connection shown or described can be indirect coupling or communication connection via some interfaces, devices or units, and can be electrical, mechanical or other form.

The above units described as separation members may be or may not be physically separated. The members shown as units may be or may not be physical units, may be located in a place, or may be distributed on multiple network units. Partial or all units can be selected according to actual needs to achieve the purposes of the embodiments.

Furthermore, all function units in each embodiment of the disclosure can be integrated into a processing unit and also can be taken as one unit. In addition, two or more units can be integrated into a unit. The above integrated units can be achieved by means of hardware, and can also be achieved by means of the combination hardware and software functional units.

The above description is only the embodiments of the disclosure, and is not intended to limit the scope of protection of the disclosure. Modifications and substitutions within the technical scope disclosed by the disclosure easily occurring to anyone of those skilled in the art should fall within the scope of protection of the present invention.

INDUSTRIAL APPLICABILITY

The disclosure enables a GCS AS (Communication Service Application Server) to timely obtain a 3GPP (3rd Generation Partnership Project) network node state and to deploy the Group Communication Service (GCS) according to the node state, thus reducing the impact of congestion or overload on the GCS and enhancing user experience with the service.

What is claimed is:

1. A method for querying a node state in Multimedia Broadcast Multicast Service (MBMS) bearer-based group communication, comprising:

sending, by a Group Communication Service Application Server (GCS AS), a request to report a network node state to a network node that sends a Group Communication Service (GCS) using an MBMS bearer, receiving network node state information reported by the network node, and selecting, according to the network node state information, a mode for sending the GCS to reduce impact of congestion or overload on reception of the GCS by target User Equipment (UE), the network node state information comprising at least one of: a congestion/overload identifier, an MBMS Service Area Identifier (SAI), an MBMS Temporary Mobile Group Identity (TMGI), and a congestion/overload start/end identifier.

2. The method according to claim 1, wherein the MBMS bearer comprises a core network bearer and an air interface bearer, and
the MBMS bearer is established before the GCS starts.

3. The method according to claim 1, wherein the network node comprises at least one of:
an evolved Node B (eNodeB), a Multi-cell/Multicast Coordination Entity (MCE), a Mobility Management Entity (MME), a MBMS Gateway (MBMS GW), and a Broadcast Multicast Service Center (BM-SC).

4. The method according to claim 1, wherein the congestion comprises that control plane signalling and/or user plane load in the network reaches a predetermined threshold; and
the overload comprises that the control plane signalling and/or the user plane load in the network exceeds capability of the network node such that the network node is not capable of processing extra signalling and/or extra user plane load any more.

5. The method according to claim 1, wherein the mode for sending the GCS comprises:
when no congestion/overload occurs, continuing sending the GCS using a current MBMS bearer, or adding a new GCS to the current MBMS bearer;
when the congestion occurs, establishing a unicast bearer for the target UE, and sending the GCS via the unicast bearer; and
when the overload occurs, queuing GCSs to be sent and sending the queued GCSs after the overload ends, or making a GCS of high priority pre-empt a resource of a current GCS to ensure sending of the GCS of high priority.

6. A system for querying a node state in Multimedia Broadcast Multicast Service (MBMS) bearer-based group communication, comprising a Group Communication Service Application Server (GCS AS) and a network node,
wherein the GCS AS is arranged to send, to a network node, a request to report a network node state, receive network node state information reported by the network node, and select, according to the network node state information, a mode for sending a Group Communication Service (GCS) to reduce impact of congestion or overload on reception of the GCS by a target UE;
the network node is arranged to send the GCS using an MBMS bearer, obtain the network node state information of the network node after receiving the request, and send the network node state information to the GCS AS;
the network node state information comprising at least one of: a congestion/overload identifier, an MBMS Service Area Identifier (SAI), an MBMS Temporary Mobile Group Identity (TMGI), and a congestion/overload start/end identifier.

7. The system according to claim 6, wherein the MBMS bearer comprises a core network bearer and an air interface bearer, and
the MBMS bearer is established before the GCS starts.

8. The system according to claim 6, wherein the network node comprises at least one of:
an evolved Node B (eNodeB), a Multi-cell/Multicast Coordination Entity (MCE), a Mobility Management Entity (MME), a MBMS Gateway (MBMS GW), and a Broadcast Multicast Service Center (BM-SC).

9. The system according to claim 6, wherein the congestion comprises that control plane signalling and/or user plane load in the network reaches a predetermined threshold; and
the overload comprises that the control plane signalling and/or the user plane load in the network exceeds capability of the network node such that the network node is not capable of processing extra signalling and/or extra user plane load any more.

10. The system according to claim 6, wherein the mode for sending the GCS comprises:
when no congestion/overload occurs, continuing sending the GCS using a current MBMS bearer, or adding a new GCS to the current MBMS bearer;
when the congestion occurs, establishing a unicast bearer for the target UE, and sending the GCS via the unicast bearer; and
when the overload occurs, queuing GCSs to be sent and sending the queued GCSs after the overload ends, or making a GCS of high priority pre-empt a resource of the current GCS to ensure sending of the GCS of high priority.

11. A non-transitory storage medium having stored thereon computer programs arranged to execute a method for querying a node state in Multimedia Broadcast Multicast Service (MBMS) bearer-based group communication, the method comprising:
sending, by a Group Communication Service Application Server (GCS AS), a request to report a network node state to a network node that sends a Group Communication Service (GCS) using an MBMS bearer, receiving network node state information reported by the network node, and selecting, according to the network node state information, a mode for sending the GCS to reduce impact of congestion or overload on reception of the GCS by target User Equipment (UE),
the network node state information comprising at least one of: a congestion/overload identifier, an MBMS Service Area Identifier (SAI), an MBMS Temporary Mobile Group Identity (TMGI), and a congestion/overload start/end identifier.

12. The non-transitory storage medium according to claim 11, wherein the MBMS bearer comprises a core network bearer and an air interface bearer, and
the MBMS bearer is established before the GCS starts.

13. The non-transitory storage medium according to claim 11, wherein the network node comprises at least one of:
an evolved Node B (eNodeB), a Multi-cell/Multicast Coordination Entity (MCE), a Mobility Management Entity (MME), a MBMS Gateway (MBMS GW), and a Broadcast Multicast Service Center (BM-SC).

14. The non-transitory storage medium according to claim 11, wherein the congestion comprises that control plane signalling and/or user plane load in the network reaches a predetermined threshold; and
the overload comprises that the control plane signalling and/or the user plane load in the network exceeds capability of the network node such that the network node is not capable of processing extra signalling and/or extra user plane load any more.

15. The non-transitory storage medium according to claim 11, wherein the mode for sending the GCS comprises:
when no congestion/overload occurs, continuing sending the GCS using a current MBMS bearer, or adding a new GCS to the current MBMS bearer;

when the congestion occurs, establishing a unicast bearer for the target UE, and sending the GCS via the unicast bearer; and when the overload occurs, queuing GCSs to be sent and sending the queued GCSs after the overload ends, or making a GCS of high priority pre-empt a resource of a current GCS to ensure sending of the GCS of high priority.

\* \* \* \* \*